United States Patent
Amador et al.

(10) Patent No.: US 10,579,588 B2
(45) Date of Patent: *Mar. 3, 2020

(54) DATA SUBSCRIPTION MANAGEMENT SYSTEM

(71) Applicant: INTERNATIONAL BUSINESS MACHINES CORPORATION, Armonk, NY (US)

(72) Inventors: Erick S. Amador, Miramar, FL (US); Rick A. Hamilton, II, Charlottesville, VA (US); Garfield W. Vaughn, South Windsor, CT (US); Timothy M. Waters, Hiram, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 15/463,637

(22) Filed: Mar. 20, 2017

(65) Prior Publication Data

US 2017/0192996 A1  Jul. 6, 2017

Related U.S. Application Data

(63) Continuation of application No. 14/851,693, filed on Sep. 11, 2015, now Pat. No. 9,633,069, which is a continuation of application No. 11/843,465, filed on Aug. 22, 2007, now Pat. No. 9,177,115.

(51) Int. Cl.
| | | |
|---|---|---|
| *G06F 16/16* | (2019.01) | |
| *G06F 16/27* | (2019.01) | |
| *G06F 16/84* | (2019.01) | |
| *G06F 16/23* | (2019.01) | |
| *G06F 21/10* | (2013.01) | |
| *G06Q 30/02* | (2012.01) | |

(52) U.S. Cl.
CPC ........ *G06F 16/162* (2019.01); *G06F 16/2365* (2019.01); *G06F 16/27* (2019.01); *G06F 16/86* (2019.01); *G06F 21/10* (2013.01); *G06Q 30/02* (2013.01); *G06F 2221/0795* (2013.01)

(58) Field of Classification Search
None
See application file for complete search history.

(56) References Cited

U.S. PATENT DOCUMENTS

| | | | |
|---|---|---|---|
| 5,625,818 | A | 4/1997 | Zarmer et al. |
| 5,768,528 | A | 6/1998 | Stumm |
| 5,919,247 | A | 7/1999 | Van Hoff et al. |
| 5,950,210 | A | 9/1999 | Nelson |
| 5,978,577 | A | 11/1999 | Rierden et al. |
| 6,167,408 | A | 12/2000 | Cannon et al. |

(Continued)

FOREIGN PATENT DOCUMENTS

| | | |
|---|---|---|
| JP | 410021061 | 1/1998 |
| WO | 2004001588 | 12/2003 |

*Primary Examiner* — Uyen T Le
(74) *Attorney, Agent, or Firm* — Jay Wahlquist; Andrew M. Calderon; Roberts Mlotkowski Safran Cole & Calderon, P.C.

(57) ABSTRACT

A method includes a digital subscription management system (DSMS) receiving from a source system a request to perform an edit of at least one data object, the DSMS sending a request for response (RFR) to subscribing systems having a copy of the at least one data object, the DSMS receiving a response from the subscribing systems, and the DSMS performing the edit.

10 Claims, 3 Drawing Sheets

(56) References Cited

U.S. PATENT DOCUMENTS

| | | |
|---|---|---|
| 6,324,587 B1 | 11/2001 | Trenbeath et al. |
| 6,704,737 B1 | 3/2004 | Nixon et al. |
| 7,113,962 B1 | 9/2006 | Kee et al. |
| 7,266,826 B2 | 9/2007 | Katiyar et al. |
| 7,562,102 B1 | 7/2009 | Sumner et al. |
| 2002/0083118 A1 | 6/2002 | Sim |
| 2002/0107829 A1 | 8/2002 | Sigurjonsson et al. |
| 2002/0133491 A1 | 9/2002 | Sim et al. |
| 2003/0061365 A1 | 3/2003 | White et al. |
| 2005/0198247 A1 | 9/2005 | Erry et al. |
| 2005/0210052 A1 | 9/2005 | Aldridge |
| 2005/0251505 A1 | 11/2005 | McCauley et al. |
| 2005/0283394 A1 | 12/2005 | McGloin et al. |
| 2006/0026182 A1 | 2/2006 | Takeda et al. |

DATA SUBSCRIPTION MANAGEMENT SYSTEM

BACKGROUND OF THE INVENTION

Field of the Invention

The present invention relates to a method and system for managing data owned by a source system and distributed to subscribing systems for consumption.

Background of the Invention

Data is a top priority for every business some of which may be mission critical and challenging to manage. Challenges may stem from: (i) growth in demand due to enhanced digital content, e-mail, internet based applications and emerging technologies in multimedia (e.g., Blu-ray Disc™ (Blu-ray Disc™ (BD) is a registered trademark of the Blu-ray Disc Association (BDA)), 4G telephone networks, etc.); (ii) pressure to retain data for compliance with growing numbers of regulations worldwide; and (iii) threats to business continuity posed by disaster, outages or even human error. Furthermore, data management is critical in the era of enterprise-wide electronic records management.

Several document and records management software exist on the market today. These products include, e.g., Microsoft Sharepoint®, Hewlett-Packard® AppIQ, Filenet®, DB2® Commonstore, DB2 Information Integrator, IBM Content, Document, and Records Manager, etc. (Microsoft, Sharepoint, and the Windows logo are trademarks of Microsoft Corporation in the United States, other countries, or both. Hewlett-Packard is a registered trademark of Hewlett-Packard Development Company, L.P., in the United States, other countries, or both. Filenet is a registered trademark of FileNet Corporation, in the United States, other countries, or both. IBM and DB2 are registered trademarks of International Business Machines Corporation in the United States, other countries, or both.) These products provide functionality to manage unstructured content and provide policy driven management functions.

Although there are currently technologies available that enable data management, data consistency remains of a primary concern within these products. For example, in the critical area of ensuring data consistency, several subscribing systems accessing the same set of unstructured data may obtain different copies of the document, or even have deleted copies of such documents. That is, it is not uncommon for different subscribing systems to have data which is no longer useful.

In one example, a "source" system creates and/or originates a data object, and is the owner of the data object and "subscribing" systems consume or use the data object once it is distributed by the source system. For example, the subscribing system may use the data object to execute some function, or to create depending data objects or subsequent data records. Also, subscribing systems may create dependent data or objects relating to the received data, either through copy and update procedures or overwriting the original local file. However, once the data is distributed to the subscribers, ensuring data integrity between the source system and subscribing systems becomes very difficult, and situations of data inconsistency may arise such as when the source system deletes a record or file on its local system, but the distributed copies of the data object on the subscribers systems are not deleted, thereby resulting in "rogue" copies, and thus, data inconsistencies.

Moreover, the source system may or may not send a transaction to the subscribing systems indicating that the data object was deleted in the source system, thereby creating data inconsistency. Furthermore, if the source system does send such a transaction, then the subscribing system may or may not take action based on the solution in the subscribing system. Thus, the source system and the subscribing systems may have data inconsistencies and be out of sync. Furthermore, if a subscribing system relates the distributed copy of the data object to another object (e.g., in a subscribing system database), deleting the distributed copy of the data may create an "orphan" document, and thus may create data inconsistencies.

Accordingly, there exists a need in the art to overcome the deficiencies and limitations described hereinabove.

SUMMARY OF THE INVENTION

In a first aspect of the invention a method comprises receiving from a source system a request to perform an edit of at least one data object, and sending a request for response (RFR) to subscribing systems having a copy of the at least one data object. The method further comprises receiving a response from each of the subscribing systems and performing the edit.

In a further aspect of the invention a system comprises a digital subscription management system (DSMS) configured to receive from a source system a request to perform an edit of at least one data object and send a request for response (RFR) to subscribing systems having a copy of the at least one data object. Additionally, the DSMS is configured to receive a response from each of the subscribing systems and perform the edit.

In a further aspect of the invention a computer program product comprises a computer usable medium having readable program code embodied in the medium. The computer program product includes at least one component to receive from a source system a request to perform and edit of at least one data object and send a request for response (RFR) to subscribing systems having a copy of the at least one data object. The computer program product further includes at least one component to receive a response from each of the subscribing systems and perform the edit.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to a method and system for managing data owned by a source system and distributed to subscribing systems for consumption. By implementing the method and system, organizations can centrally manage record keeping policies on distributed content, or data objects regardless of where content is physically stored. Additionally, by implementing the present invention it is possible to improve data management by eliminating data inconsistencies. More specifically, by implementing aspects of the invention, it is possible to eliminate data inconsistencies between a source system and subscribing systems by preventing the occurrence of rogue data and orphan data.

In implementations, a Data Subscription Management System (DSMS) manages the dissemination of data objects and helps to control or prevent the dissemination of rogue data objects, content or files. In embodiments, the DSMS stores knowledge of itself and partner source systems and the data that each source system publishes (enabled through a grid, mesh network, network file shares, grid storage, etc.). Additionally, the DSMS manages the subscribers of the published data, and leverages content metadata to control the published data itself. Furthermore, the DSMS may disallow published content deletion of a data object that has at least one subscriber.

System Environment

Figure 1:
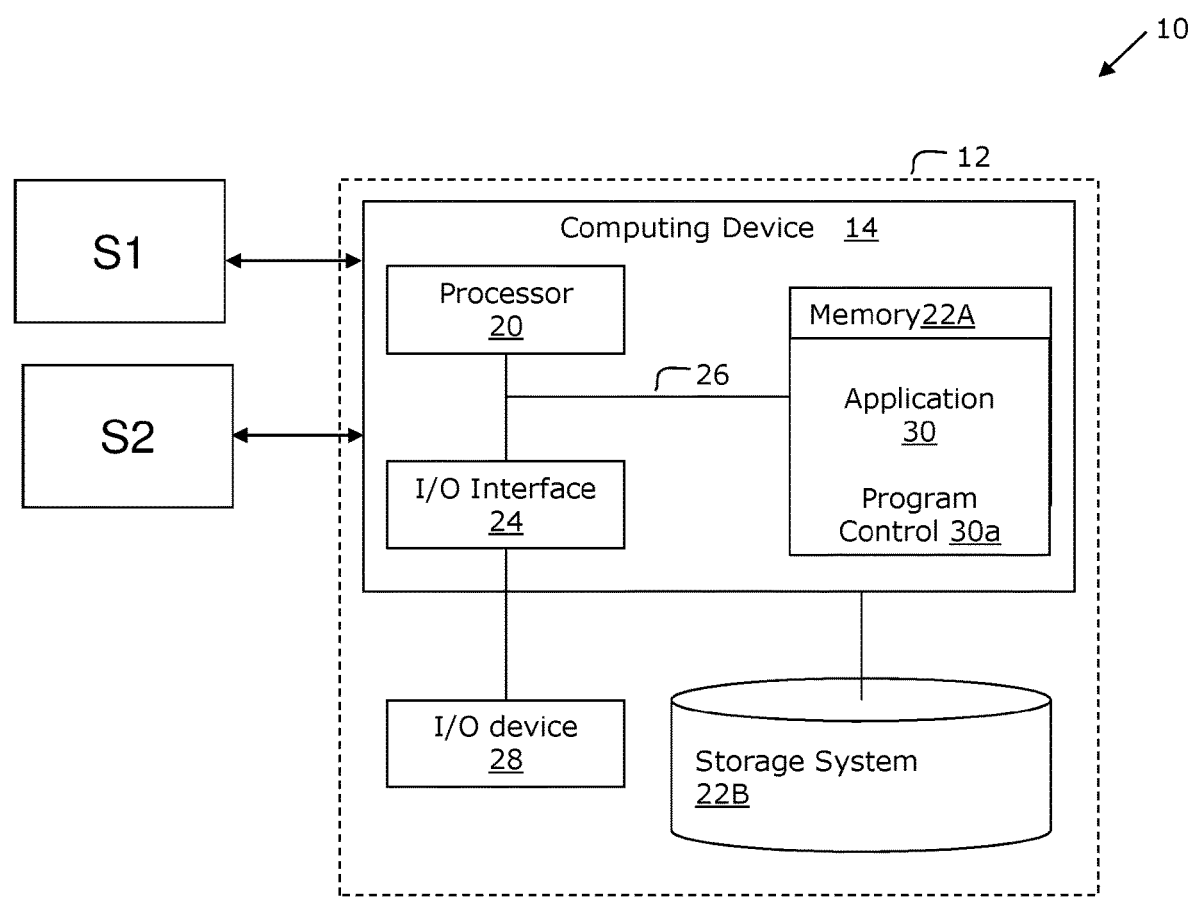
FIG. 1 shows an illustrative environment for managing the processes in accordance with the invention.

FIG. 1 shows an illustrative environment 10 for managing the processes in accordance with the invention. To this extent, the environment 10 includes a computer infrastructure 12 that can perform the processes described herein. In embodiments, the computer infrastructure 12 is the DSMS in accordance with the invention. The computer infrastructure 12 is in communication with at least one source system "S1" and at least one subscribing system "S2".

The computer infrastructure 12 includes a computing device 14 that comprises an application 30, which includes a program control 30a operable to perform processes herein, e.g., manage data owned by a source system and distributed to subscribing systems for consumption, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code (e.g., program control 30a), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary System

Figure 2:
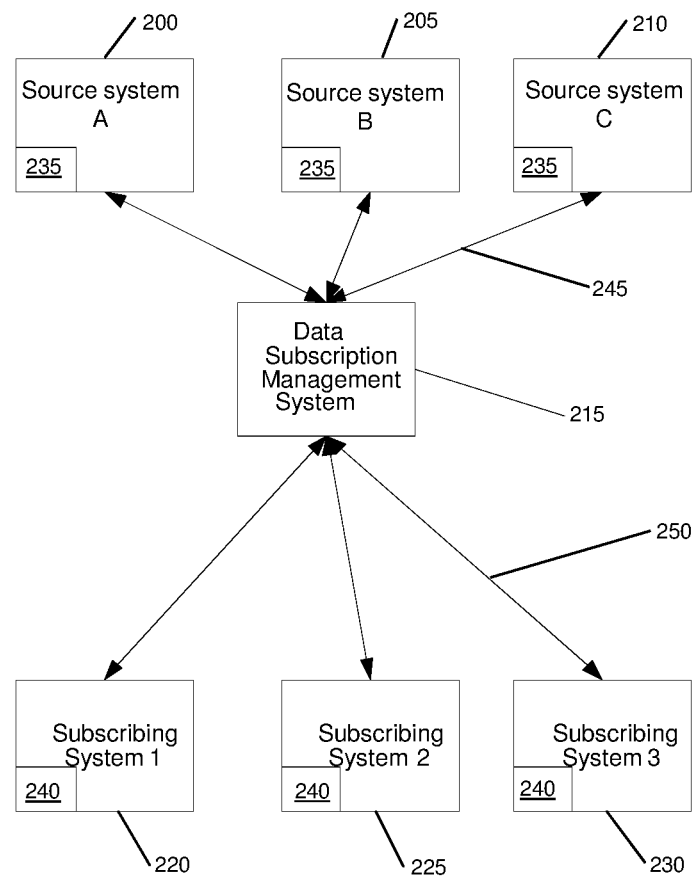
FIG. 2 shows an exemplary embodiment of present invention.

FIG. 2 depicts an exemplary embodiment of the invention, showing an overall functionality of the DSMS. In embodiments, the DSMS 215 may be a software application, e.g., middleware, implemented in the environment of FIG. 1. Alternatively, the DSMS 215 may be a system as implemented by FIG. 1.

In FIG. 2, The DSMS 215 is in communication with a plurality of source systems 200, 205, and 210 and subscribing systems 220, 225, 230. The source systems 200, 205, and 210 contain source data objects in communication (represented by lines 245) with the DSMS 215. It should be understood that, while three source systems and three subscribing systems are shown, the invention contemplates any number of source systems and subscribing systems.

Each source system (e.g., 200, 205, 210) includes an application programming interface (API) function 235 that communicates with the DSMS 215. More specifically, the API function 235 publishes data objects to the DSMS 215 and communicates requests and responses to and from the DSMS 215. The API function 235 may be a software program or function that interfaces and communicates with the DSMS 215. By way of example, the API function 235 may communicate with the DSMS 215 to request deletion of certain data, as discussed herein.

In embodiments, each of the source systems (200, 205 and 210) may register with the DSMS 215. This allows the DSMS 215 to be aware of each of the source systems and all of the data objects those source systems may contain. Moreover, the source system knowledge of subscribing systems and content may be replicated to other source systems, so that each source system may be aware of the other source systems and subscribing systems. Accordingly, in embodiments, the source systems (e.g., 200, 205, 210) may create a data object and publish the data object to the DSMS 215. A record map may be created in the DSMS 215 that relates the source system and the data object.

The plurality of subscribing systems 220, 225, and 230 subscribe to the DSMS 215 and are in communication (represented by lines 250) with the DSMS 215. In embodiments, each subscribing system (e.g., 220, 225, and 230) includes an API function 240 that is responsible for communicating with the DSMS 215. The API function 240 may be a software program or function that interfaces and may communicate with the DSMS 215. More specifically, the API function 240 may receive deletion requests, or requests for response (RFRs) from the DSMS 215, and communicate responses to the DSMS 215. Additionally, according to an aspect of the invention, by subscribing to the DSMS 215, the subscribing systems (e.g., 220, 225, 230) may obligate themselves to respond to the RFRs.

In implementation, the subscribing system (e.g., 220, 225 or 230) may need a particular data object. To obtain the data object, the subscribing system, which is registered with the DSMS 215, requests and acquires a copy of the particular data object from the DSMS 215. In embodiments, the subscribing system may not know and may not need to know which source system created the data object. Once the subscribing system subscribes to a data object that has been published in the DSMS 215, data will be added to the record map, indicating the relationship between the source system, the data object and the subscribing systems.

If a source system wants to delete a data object published to the DSMS 215, rather than deleting the data object in the source system (e.g., a source system database), the source system will send a deletion request to the DSMS 215. Once a deletion request for a data object is initiated in a source system, the DSMS 215 will "flag" the record map for that data object indicating that a deletion request for that data object has been received. In embodiments, the flag will prevent future transactions against that data object until that data object is either deleted, or the deletion flag removed. Thus, once a data object has been flagged, no other subscribing system may be able to receive a copy of the data object, until the flag is removed.

After the deletion flag is set, the DSMS 215 will interrogate the subscribing systems to determine which of the subscribing systems may have a copy of the data object subject to the deletion request. In embodiments, the DSMS 215 may utilize the record map to determine which subscribing systems have a copy of the data object subject to the deletion request. Also, in embodiments, the DSMS 215 may send a deletion request, e.g., a request for response, to the subscribing systems that have subscribed to that data object. Once the DSMS sends a deletion request to the subscribing system, a request to terminate the dependency (e.g., a subscribing system's subscription to the data object) will be triggered. When all dependencies are broken (e.g., no more rogue or orphan documents exist related to that data object), the source system may carry out the formal deletion by deleting the data object in the source system (e.g., a source system database).

Additionally, in embodiments, if the DSMS 215 determines that a subscribing system has a copy of the data object subject to deletion, the DSMS 215 may prevent the deletion of the data object both in the DSMS 215 and the source system until each subscribing system has taken appropriate action. Also, appropriate action or a response by a subscribing system (e.g., 220, 225, 230) may be a deletion of the data object in the subscribing system (e.g., a subscribing system database). By deleting the data object in the subscribing system, the dependency of the subscribing system on the source system for that data object will be terminated.

However, there may be situations where a deletion of the data object in the subscribing system may create orphan documents. That is, the subscribing system may have related the data object subject to the deletion request with other data in their system. In this situation, if the subscribing system were to delete the data object in their system, the related other data may become orphan documents. In other words, were the deletion to be carried out, the related other data would be related to a non-existing data object. An appropriate action or response by the subscribing system, in this situation, may include identifying the data object subject to the deletion request as, e.g., "no longer useable," "no longer current," "not a complete record," "not an accurate record," etc., in the subscribing system (e.g., a subscribing system database), while maintaining a copy of the data object. Thus, according to this aspect of the invention, the subscribing system may not be required to delete the data object. This aspect of the invention allows for data consistency between a source system and a subscribing system (as the dependency to the data object has been terminated), while preventing the creation of orphan documents (which is a form of data inconsistency within the subscribing system).

Once a response has been received by the DSMS 215 from a subscribing system, the DSMS 215 may determine if all subscribers have responded. Once all responses from the subscribing systems have been received by the DSMS 215 (indicating that appropriate action has been taken), the DSMS 215 may execute the deletion action against the flagged data object in the DSMS 215 (e.g., a DSMS database), and send a reply that the deletion of the data object has been completed to the corresponding source system. Upon receiving the notification that the DSMS 215 has executed the deletion action against the flagged data object, the source system may delete their original copy of the data object, thus completing the deletion.

According to a further aspect of the invention, each subscribing system may have an application programming interface (API) function 240 that will act per the request of the DSMS 215, which will trigger a request for response (RFR) to be sent to the subscribing systems. The RFR may indicate that deletion of the data object has been requested and may direct the subscribing systems to take some appropriate action.

Additionally, while the invention has been described as a stand alone system, according to an aspect of the invention, the DSMS 215 may be a modular system that may be added to a pre-existing system, e.g., a database system. In embodiments, this may require the source systems and the subscribing systems to incorporate API systems for communicating with the DSMS 215.

Furthermore, while the invention has been described in terms of deletion requests, the invention contemplates other actions that may be managed by the DSMS 215. For example, a source system may wish to make alterations to a data object, or create a replacement data object. According to aspects of the invention, these types of data requests may be handled through the DSMS 215 to ensure data consistency.

According to a further aspect of the invention, in the event that a record or flagged content is requested as part of a litigation, for example, the source systems via replicated databases in the preferred embodiment will have the knowledge of which subscribing system(s) has/have the content.

Through the use of additional functions in the source systems, the flagged content can be recaptured for use in the litigation and logically moved into another policy set for special or exception handling.

Flow Diagram

The steps of the flow diagram described herein may be implemented in the environment of FIG. 1. The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Figure 3:
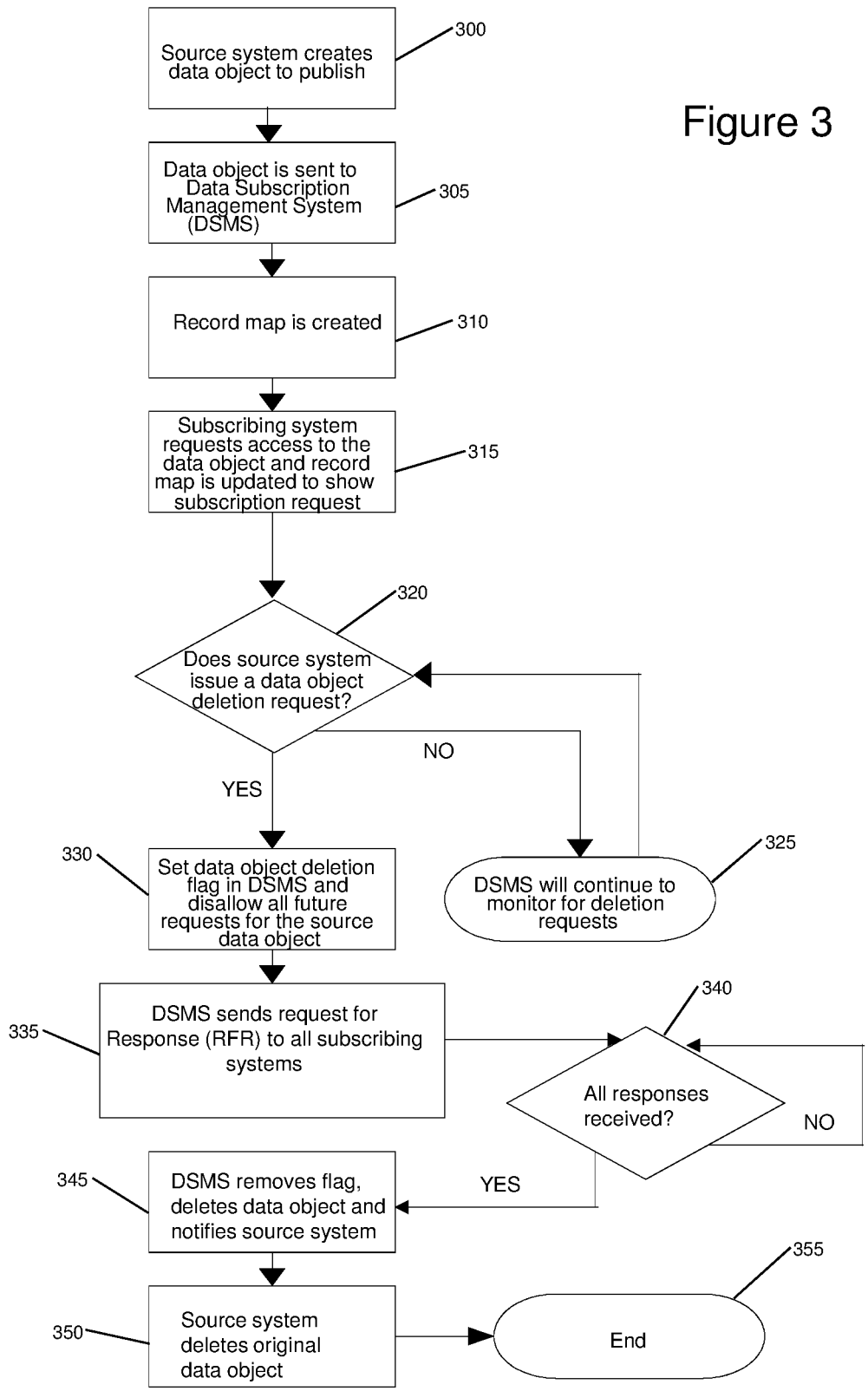
FIG. 3 shows an exemplary flow chart for performing the steps of the invention.

FIG. 3 shows an exemplary flow diagram for performing steps of the invention. At step 300, a source system may create a data object to publish. As should be understood, the invention contemplates that this data object may be any type of data. At step 305, the data object may be sent to the DSMS for publication. At step 310, a record map may be created that matches or correlates the data object with the source system. At step 315, a subscribing system may request a copy of a data object from the DSMS, a copy of the requested data object may be distributed to the subscribing system by the DSMS, and the DSMS may update the record map to show the data object request and grant.

At step 320, a determination may be made as to whether a source system has issued a deletion request for a data object. If, at step 320, the source system has not issued a deletion request, at step 325, the DSMS will continue to monitor for deletion requests, and the process proceeds to step 320. If, at step 320, the source system has issued a deletion request for a source data object, at step 330, the DSMS may set a data object deletion flag in the DSMS. According to an aspect of the invention, setting the deletion flag may disallow all future requests for and/or distribution of the particular data object.

At step 335, the DSMS may send a request for response (RFR) to all subscribing systems that have a copy of the data object subject to deletion. The RFR may request that the subscribing system delete the data object on their system and send a response indicating the deletion. Additionally, the RFR may request information regarding the subscriber systems' state of use of the data object and set configurable policy thresholds for future use by the subscribing system (e.g., eliminating the dependency, while allowing the subscribing system to maintain a copy of the data object).

At step 340, a determination may be made whether all responses have been received from the subscribing systems that have a copy of the data object subject to deletion. If, at step 340, all responses have not been received, then the process continues with step 340. If, at step 340, all responses have been received, then the process proceeds to step 345.

At step 345, when all the subscriber systems of the data object have responded to the RFR, the DSMS may notify the source system that all RFRs have been received, remove the flag, and delete their copy of the particular data object subject to the deletion request (e.g., in a DSMS database). At step 350, upon notification from the DSMS that the data object is no longer required and/or that the flag has been removed, the source system may delete the original data object in their system (e.g., a source system database). At step 355, the process ends.

While the invention has been described in terms of embodiments, those of skill in the art will recognize that the invention can be practiced with modifications and in the spirit and scope of the appended claims.

What is claimed is:

1. A computer program product for a digital subscription management system (DSMS), the computer program product comprising a computer readable storage medium having program instructions embodied therewith, the program instructions executable by a computing device to cause the computing device to:
   receive a request to perform an edit of at least one data object published by a source system, wherein the edit includes deleting data of the one data object;
   send a request for response (RFR) to subscribing systems, wherein the RFR requests that the subscribing systems perform the edit in response to the at least one data object being not related to at least one other data object on a same subscribing system, and the RFR requests that the subscribing systems identify the at least one data object as subject to the edit when the at least one data object is related to the at least one other data object on the same subscribing system, such that the at least one other data object becomes orphaned in response to the edit of the at least one data object being performed;
   perform the edit after receiving the response from each of the subscribing systems on the at least one data object in response to the at least one data object being not related to at least one other data object on a same subscribing system; and
   identify the at least one data object as subject to the edit, without performing the edit, in response to the at least one data object being related to at least one other data object on the same subscribing system such that the at least one other data object becomes orphaned in response to the edit of the at least one data object being performed.

2. The computer program product of claim 1, wherein the request to perform the edit comprises at least one of:
   a request to delete the at least one data object;
   a request to alter the at least one data object;
   a request to recapture the at least one data object; and
   a request to replace the at least one data object.

3. The computer program product of claim 1, further comprising program instructions to receive in a DSMS database a copy of the at least one data object from the source system for publication.

4. The computer program product of claim 1, further comprising program instructions to distribute the copy of the at least one data object to at least one subscribing system.

5. The computer program product of claim 1, further comprising program instructions to create a record map which relates the at least one data object with the source system.

6. The computer program product of claim 5, further comprising program instructions to update the record map to relate a distribution of the copy of the at least one data object to at least one of the subscribing systems with the at least one data object and the source system.

7. The system of claim 1, further comprising program instructions to:
receive a request from at least one of the subscribing system for the copy of the at least one data object; and
distribute the copy of the at least one data object to the at least one subscribing system.

8. The computer program product of claim 1, further comprising program instructions to tag a record map of the at least one data object with a flag in response to the receiving the request to edit the at least one data object, wherein the flag prevents further distributing of the copy of the at least one data object at least until the flag is removed from the record map.

9. The computer program product of claim 1, further comprising program instructions to:
inform the source system that the edit of distributed copies of the at least one data object has been performed; and
permit the source system to perform the edit of the at least one data object in a source system database.

10. The computer program product of claim 1, wherein in response to the at least one data object being related to the at least one other data object on the same subscribing system, the response from an individual subscribing system comprises:
an indication that the individual subscribing system has updated a database containing the copy of the at least one data object to reflect that the copy of the at least one data object is at least one of:
no longer useable;
no longer current;
not a complete record; and
not an accurate record.

\* \* \* \* \*